July 4, 1950  J. W. SPEAKER  2,513,757
PATCH UNIT FOR VULCANIZERS
Filed Oct. 11, 1947  2 Sheets-Sheet 1
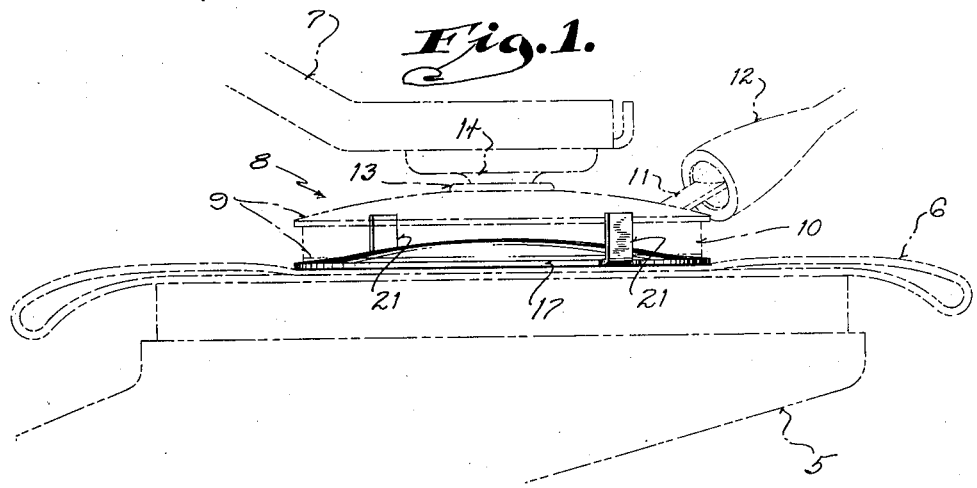
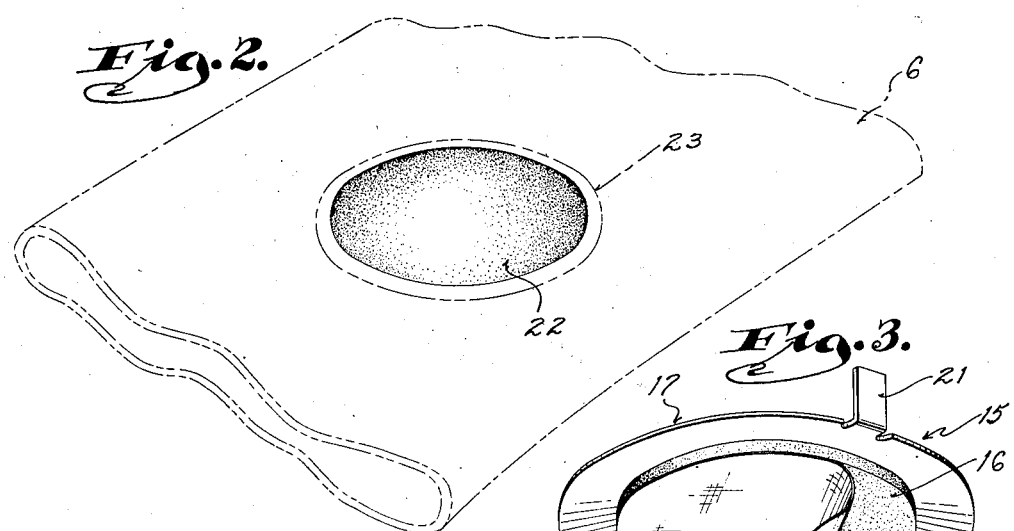
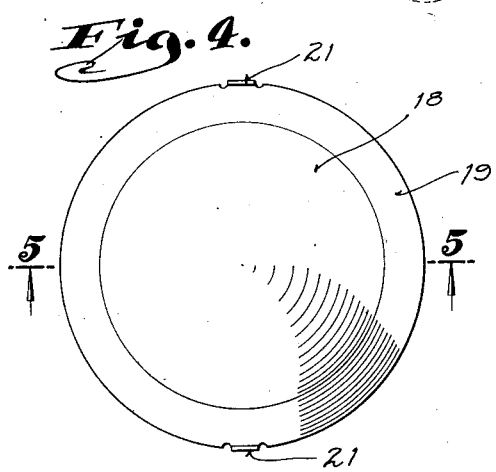
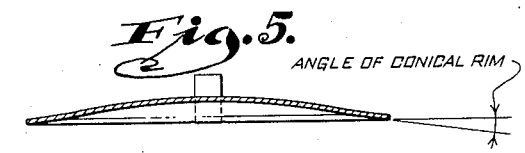
Inventor
John W. Speaker
By Ira Milton Jones
Attorney July 4, 1950 J. W. SPEAKER 2,513,757
PATCH UNIT FOR VULCANIZERS
Filed Oct. 11, 1947 2 Sheets-Sheet 2
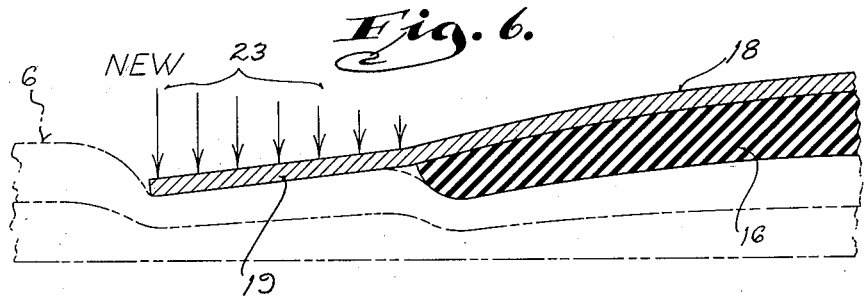
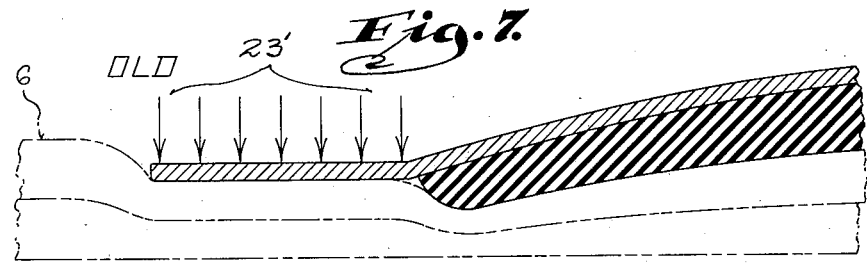
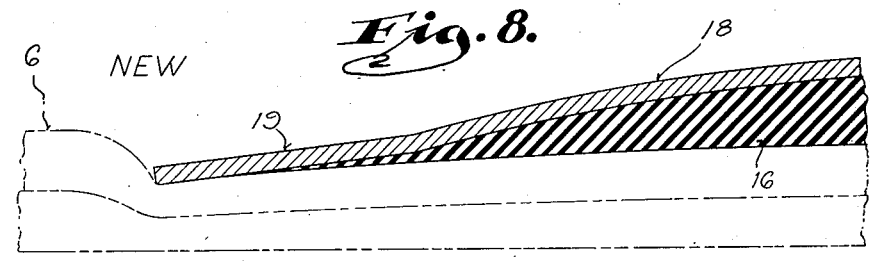
Inventor
John W. Speaker
By Ira Milton Jones
Attorney Patented July 4, 1950

2,513,757

UNITED STATES PATENT OFFICE 2,513,757

PATCH UNIT FOR VULCANIZERS

John Walter Speaker, Milwaukee, Wis.

Application October 11, 1947, Serial No. 779,265

3 Claims. (Cl. 18—18)

This invention relates to the art of vulcanizing patches to inner tubes for tires and to other articles of natural or synthetic rubber.

There are two accepted methods by which vulcanization of a patch to a tire or other article may be effected, differing principally in the manner in which the necessary heat is produced.

In one case heat is produced by the combustion of a fuel pad or wafer contained within a shallow pan; in the other an electrical heating element is employed. While this invention is applicable to both schemes, it is particularly suitable for use with electrical vulcanizing equipment.

Where a combustible pad is employed as a heat source, the pad is held in a shallow pan stamped from sheet metal and having a flat bottom, to the underside of which the patch is adhered. The exposed face of the patch is, of course, protected by a fabric cover sheet which is pulled off just prior to use. The fuel material contained within the pan is ordinarily a piece of paperboard impregnated with a suitable combustible substance which may be ignited with a match. In use the tube or other article to be repaired is placed flatwise upon a table or anvil, with the punctured part up. The protective covering is removed from the patch, and the pan, with the patch adhered thereto, is then clamped upon the surface of the tube or article, over the puncture or hole therein, clamping pressure being applied through a spider, the arms of which rest upon the edges of the pan.

Inasmuch as the patch is smaller than the bottom of the pan, downward pressure upon its edges deforms the bottom of the pan to bring its periphery down onto the tube, and the bottom of the pan is thus given substantial concavity. Because the marginal edges of the pan engage the surface of the tube with sufficient pressure to preclude flow of the patch material from beneath the pan during vulcanization, the edge of the patch will be appropriately feathered.

When an electrical heating element is used as the heat source, however, the patch is carried at the underside of a stamped metal disc having a concave underside substantially coextensive with the area of the patch, and a marginal rim encircling the patch. The heating element consists of two superposed concave sheet metal discs with a suitable insulation therebetween in which an electrical heating element is imbedded. A rivet secures the assembly together. In use the heating element is positioned on top of the stamped disc which carries the patch, and a pressure applying clamp engages the top of the hollow rivet of the heating element. Clamping pressure is thus carried through the rivet down onto the top of the stamped patch carrier directly at its center.

The copending application of John W. Speaker, Serial No. 692,663, filed August 23, 1946, may be referred to for a more detailed description of the manner in which the clamping pressure is obtained. It will be seen, however, that because the pressure is applied at the center of the patch carrying unit, its edges are not pressed firmly into engagement with the surface of the inner tube or other article being repaired, with the result that considerable difficulty has been experienced in the past with this type of patch because the edges of the patch were not feathered and securely adhered to the surface of the tube.

Such imperfect patches, when applied to the inner tubes of tires, are a source of great danger to the motorist, since the unsecured edge of the patch continually scuffs against the tire casing and tends to tear the patch off the tube, with consequent danger of a blowout when the scuffing process reaches a critical point.

I have discovered that this unsatisfactory result arose from the fact that the marginal flange or rim on the stamped metal patch carrier or disc was perfectly flat. As a result the peripheral edge portion of the rim on the disc pressed upon the surface of the tube or article being repaired with no greater force than was applied to the inner portion of the rim, and in fact it was noted that because of the inherent resiliency of the stamped patch carrier at times its rim was flexed upwardly at its outer edge so that there was, in fact, less pressure at the marginal edge of the rim than at its inner portion. This condition, as will be hereinafter more fully described, was responsible for the abrupt edges and generally undesirable condition of patches formed by this method.

It is, therefore, the purpose and object of this invention to provide a patch carrier or mould element especially adapted for use with electrical vulcanizers of the type described wherein the objections noted are overcome and assurance is had instead that the edge of the patch will always be feathered and securely adhered to the surface of the tube or other article being repaired.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a view in side elevation illustrating in construction lines a portion of a vulcanizing clamp of the type which employs an electrical heating element and illustrating in general the manner in which the improved patch carrier or mould element of this invention is utilized in practice;

Figure 2 is a perspective view showing a portion of an inner tube with a patch applied thereto in accordance with this invention;

Figure 3 is a perspective view of the patch carrier or mould element with a patch thereon, said view being taken from the bottom and showing the manner in which the protective cover is pulled off from the patch;

Figure 4 is a top plan view of the patch carrier or mould element per se;

Figure 5 is a cross-sectional view taken through Figure 4 on the line 5—5;

Figure 6 is a greatly enlarged sectional view through the tube, patch, and mould element showing the relationship between these parts under pressure but before vulcanization starts;

Figure 7 is a view similar to Figure 6 but showing the condition which obtains at this time when the conventional or old construction is employed;

Figure 8 is a view similar to Figure 6 but showing the relationship which obtains after vulcanization; and Figure 9 is a view similar to Figure 7 showing the objectionable result often produced by the old or conventional form of mould element.

Referring now particularly to the accompanying drawings, the numeral 5 designates the supporting table or anvil of a vulcanizing clamp of the type shown and described in the aforesaid copending application, Serial No. 692,663, filed August 23, 1946. The table or anvil 5 supports the inner tube 6 or other article to be repaired during vulcanization of a patch thereto. A pressure arm 7 cooperates with the table or anvil to provide the necessary pressure.

Heat for the vulcanizing process is derived from an electrical heating unit indicated generally by the numeral 8 and which consists of two superimposed dished discs 9 with a layer of insulation 10 therebetween and in which the heating element per se (not shown) is imbedded. One end of the heating element is connected to a radially projecting terminal 11 to which a supply lead 12 is attached and the other end of the heating element is grounded to a hollow rivet 13 which secures the several parts of the heating unit together and which in turn is engaged by a pressure applicator 14 on the underside of the clamp arm 7.

The patch to be vulcanized to the tube or other article to be repaired forms part of a unit designated generally by the numeral 15 and which, as best shown in Figure 3, comprises a vulcanizable patch 16 and a stamped metal disc 17 having a central dished portion 18 and a rim 19. The dished central portion 18 provides a substantially spheroidal under-surface to which the vulcanizable patch 16 is adhered, the periphery of the patch being substantially at the juncture of the central dished portion and the rim 19. A protective cover sheet 20 is adhered to the patch to be removed just prior to use.

In use the unit 15 is interposed between the inner tube and the heating unit 8 as shown in Figure 1. A pair of upstanding tongues 21 projecting from the edge of the rim 19 engage in appropriate notches of the discs 9 of the heating unit to hold these parts centered with respect to each other. With the parts so positioned the conductor 12 is clipped to the terminal 11 and pressure is applied by the arm 7 which presses down on the hollow rivet 13 and through it exerts pressure upon the top side of the disc 17 directly at the center.

The general association of the parts thus far described has been in use heretofore but in the past the rim 19 was always perfectly flat as shown in Figures 7 and 9. In contrast with this old practice the rim 19 in the present invention is flared outwardly and downwardly so that the underside thereof is substantially conical. By virtue of this change in the disposition and shape of the rim 19, a feathered edge is assured for the completed patch 22 (Figure 2) and such unsatisfactory conditions as illustrated in Figure 9 are avoided. This will be understood from a consideration of Figures 6 to 9 inclusive.

As indicated by the arrows 23 in Figure 6 the periphery of the rim 19 presses down upon the top surface of the inner tube 6 or other article to be repaired with greater pressure than any other portion of the rim. Thus there is an increasing resistance to outward radial flow of the patch material as this material becomes plastic and starts to flow during the vulcanization process. Such radially outward flow of the patch material is induced by the energy stored within the walls of the inner tube or other article being repaired by the pressure applied thereon through the patch. A condition thus exists wherein one force tending to squeeze the plastic patch material out from under the disc 16 is balanced against another force resulting from the increasing resistance to outward radial flow offered by the increased pressure upon the inner tube toward the periphery of the rim, and this condition obtains notwithstanding the inherent resiliency of the stamped carrier disc 17.

To assure good results and to guard against having the plastic patch material squeezed out from under the rim, the rim must have a radial dimension large enough to assure having the balance of these forces occur before the plastic patch material reaches the periphery of the rim. When this condition is maintained the finished patch has a very fine feathered edge surrounded by the impression 23 of the marginal portion of the rim (see Figure 2).

Though the actual dimensions of the patch unit which comprise the stamped disc 17 and the vulcanizable patch 16, of course, vary with the size of the patch for purposes of illustration, the following dimensions are given: for a round patch of approximately one and seven-eighths inches in diameter the outside diameter of the rim 19 is two and five-eighths inches. The dished center portion 18 has a concavity of a six inch radius and the angle of the downward outward flare of the rim 19 is three degrees, the entire disc being a stamping from .032 inch stock and thus having such resiliency that if the rim 19 were flat as shown in Figures 7 and 9, good vulcanizing pressure at the center of the disc would cause upward flexure of the outer edge of the rim. It is, of course, to be understood that these dimensions merely apply to one size of patch unit and are also subject to variation within limits, the important consideration being that the rim is downwardly and outwardly flared and extends a substantial distance beyond the periphery of the patch.

When the rim is flat as has been the case heretofore the pressure with which it engages the top of the tube or other article being repaired is the same at all points as indicated by the arrows 23' in Figure 7 or even of decreasing magnitude due to the very possible upward flexure of the outer edge of the rim. Thus there is no increasing resistance to the radially outward flow of the patch material and as a result the patch material often flows out from under the disc as shown in Figure 9. A feathered edge is therefore an improbability. On the contrary, the patch invariably has an abrupt margin which presents a dangerous condition in that the patch can be easily worked loose.

From the foregoing description taken in connection with the accompanying drawings, it will be readily apparent that this invention achieves a substantial improvement in the art of vulcanizing patches to tire inner tubes and other rubber articles to be repaired and that it enables the formation of a patch having the optimum assurance against becoming detached.

What I claim as my invention is:

1. A patch unit for use with vulcanizers comprising: a resilient stamped sheet metal dish shaped mould element and a patch adhered to the underside of said mould element and having its periphery spaced inwardly of the periphery of the mould element so as to leave a rim encircling the patch, the rim being downwardly flared and having its periphery below the portion of the mould element immediately adjacent to the periphery of the patch so that when pressure is applied to the patch unit the periphery of the rim is forced into sealing engagement with the surface of an article being repaired, whereby as the patch material flows outwardly during vulcanization the downward flare of the rim forms the patch material into a feathered edge.

2. As an article of manufacture, a patch unit for use with tire patch vulcanizers, comprising: a stamped sheet metal disc; a rim on the disc, said rim having a downwardly directed substantially conical underside; and a vulcanizable patch adhered to the underside of the disc with its periphery spaced a substantial distance from the periphery of the rim.

3. As an article of manufacture, a patch unit for use with tire patch vulcanizers, comprising: a stamped metal disc having its central portion dished to provide a concave substantially spheroidal undersurface and having its rim which surrounds the central dished portion downwardly and outwardly flared; and a vulcanizable patch adhered to the concave undersurface of the dished central portion of the disc with the periphery of the patch substantially at the junction of the rim and the dished central portion.

JOHN WALTER SPEAKER.

REFERENCES CITED

The following references are of record in the file of this patent:

UNITED STATES PATENTS

| Number | Name | Date |
| --- | --- | --- |
| 1,039,309 | McGraw | Sept. 24, 1912 |
| 2,242,568 | Bronson | May 20, 1941 |